United States Patent [19]

Rasberger et al.

[11] 3,954,708

[45] May 4, 1976

[54] SYNTHETIC POLYMERS STABILIZED WITH A NICKEL BENZOATE AND A POLYOL

[75] Inventors: Michael Rasberger, Allschwil; Jean Rody, Basel; Paul Moser, Riehen; Helmut Müeller, Binningen, all of Switzerland

[73] Assignee: Ciba-Geigy Corporation, Ardsley, N.Y.

[22] Filed: Dec. 12, 1974

[21] Appl. No.: 532,142

Related U.S. Application Data

[62] Division of Ser. No. 365,801, May 31, 1973, Pat. No. 3,867,340.

[30] Foreign Application Priority Data

June 21, 1972 Switzerland..................... 9334/72

[52] U.S. Cl.................... 260/45.75 N; 260/33.2 R; 260/45.85 S; 260/33.4 PQ; 260/45.85 B; 260/45.95 L; 260/45.95 S; 260/45.95 R

[51] Int. Cl.$^2$............................................ C08J 3/20
[58] Field of Search............... 260/33.2 R, 33.4 PQ, 260/45.95 L, 45.95 S, 45.95 G, 45.75 N, 45.85 B, 45.85 S

[56] References Cited

UNITED STATES PATENTS

| | | | |
|---|---|---|---|
| 3,189,630 | 6/1965 | Smutny | 260/45.75 R |
| 3,285,855 | 11/1966 | Dexter et al. | 260/45.85 B |

FOREIGN PATENTS OR APPLICATIONS 882,037    11/1961    United Kingdom

*Primary Examiner*—V. P. Hoke
*Attorney, Agent, or Firm*—Luther A. R. Hall

[57] ABSTRACT

A new composition of nickel salts of hydroxybenzoic acids and polyols are used as stabilisers of polymers.

12 Claims, No Drawings

SYNTHETIC POLYMERS STABILIZED WITH A NICKEL BENZOATE AND A POLYOL

This is a division of application Ser. No. 365,801 filed on May 31, 1973, now U.S. Pat. No. 3,867,340, issued Feb. 18, 1975.

The invention relates to new mixtures consisting of nickel salts of hydroxybenzoic acids and alcohols, their use for protecting polymeric substrates and/or as dyestuff acceptors, and, as an industrial product, the polymers protected by means of these mixtures.

The mixtures consist of (A) a compound of the formula

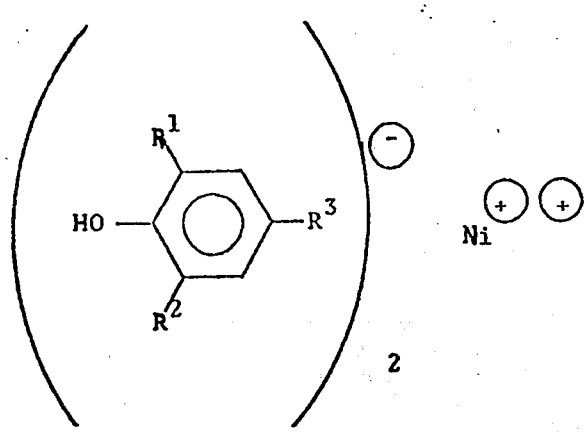

wherein $R^1$ denotes hydrogen or alkyl with 1 to 5 carbon atoms, and, of the substituents $R^2$ and $R^3$, one denotes an alkyl radical with 3 to 8 carbon atoms and the other denotes —COO $^-$, and $n$ denotes a figure from 0 to 2, and (B) one of the compounds a. of the formula

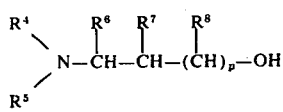

wherein $R^4$ denotes hydrogen, alkyl with 1 to 4 carbon atoms, cycloalkyl with 5 to 10 carbon atoms, aryl with 6 to 10 carbon atoms or a radical of the formula

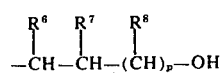

$R^5$ denotes hydrogen, alkyl with 1 to 4 carbon atoms or the radical of the formula

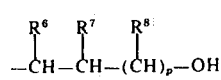

or $R^4$ and $R^5$ together with the nitrogen atom denote the radical of a 5-membered or 6-membered saturated heterocyclic structure of the pyrrolidine, piperidine, piperazine or morpholine series, $R^6$, $R^7$ and $R^8$ denote hydrogen, or one of $R^6$, $R^7$ and $R^8$ denotes alkyl with 1 to 4 carbon atoms and $p$ denotes 0 to 1, or b. of the formula

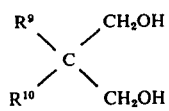

wherein $R^9$ denotes hydrogen, alkyl with 1 to 4 carbon atoms, —OH, —NH$_2$, —CH$_2$OCH$_2$C(CH$_2$OH)$_3$ or —CH$_2$—OH and $R^{10}$ denotes hydrogen, —CH$_2$OH or alkyl with 1 to 4 carbon atoms, or c. of the formula

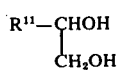

wherein $R^{11}$ denotes hydrogen, alkyl with 1 to 4 carbon atoms or —CH$_2$OR$^{12}$ and $R^{12}$ denotes hydrogen, alkyl with 1 to 18 carbon atoms or phenyl, or d. of the formula

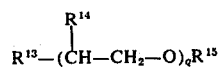

wherein $R^{13}$ denotes —OH,

or —OCH$_2$CHOHCH$_2$OH, $R^{14}$ denotes hydrogen or alkyl with 1 to 4 carbon atoms, $R^{15}$ denotes hydrogen or alkyl with 1–4 carbon atoms and $q$ denotes 2 or 3, or e. a mixture of the compounds listed under (a), (b), (c) and (d).

Preferred mixtures are those consisting of (A) a compound of the formula I, in which $R^1$ denotes hydrogen or alkyl with 1 to 4 carbon atoms, and, of the substituents $R^2$ and $R^3$, one denotes an alkyl radical with 3 or 4 carbon atoms and the other denotes —COO$^-$, and $n$ denotes a value from 0 to 2, especially 0.3 to 0.8, and (B), one of the compounds
a. of the formula

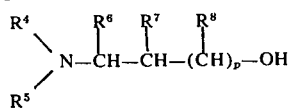

wherein $R^4$ denotes hydrogen, alkyl with 1 to 4 carbon atoms, cyclohexyl, phenyl or a radical of the formula

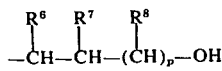

$R^5$ denotes hydrogen, alkyl with 1 to 4, especially 1 or 2, carbon atoms or a radical of the formula

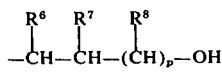

or $R^4$ and $R^5$ together with the nitrogen atom denote the radical of a 5-membered or 6-membered, saturated heterocyclic structure of the pyrrolidine, piperidine, piperazine or morpholine series, $R^6$, $R^7$ and $R^8$ denote hydrogen, or one of $R^6$, $R^7$ and $R^8$ denotes methyl and P denotes 0 or 1, or b. of the formula

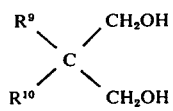

wherein $R^9$ denotes hydrogen, methyl, —OH, —$NH_2$ or —$CH_2OH$ and $R^{10}$ denotes hydrogen, —$CH_2OH$ or methyl, or c. of the formula

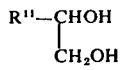

wherein $R^{11}$ denotes hydrogen, alkyl with 1 to 4 carbon atoms or —$CH_2OR^{12}$ and $R^{12}$ denotes hydrogen, alkyl with 1 to 12, especially 8 to 12, carbon atoms or phenyl, or d. of the formula

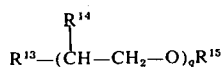

wherein $R^{13}$ denotes —OH,

or —$OCH_2CHOHCH_2OH$, $R^{14}$ denotes hydrogen or methyl, $R^{15}$ denotes hydrogen or ethyl and $q$ denotes 2 or 3.

Particularly preferred mixtures are those consisting of (A) a compound of the formula Ia

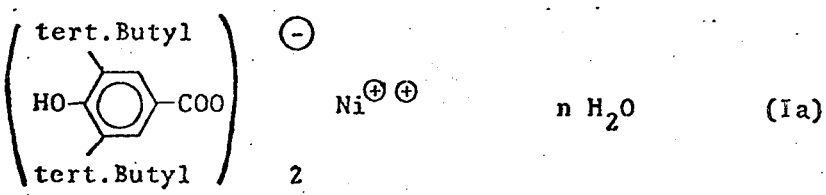

in which $n$ denotes a value from 0 to 2 and (B) a compound under (a) with $p$ equal to 0, or (b), (c) or (d).

It has been found, surprisingly, that the mixtures according to the invention are good stabilisers against the light-induced degradation of synthetic polymers, and act as dyestuff acceptors. It has already known to stabilise polyolefines with simple nickel benzoates. Surprisingly, the new mixtures possess a substantially better heat-stability than these salts. They can therefore be processed at substantially higher temperature without the polymers becoming discoloured in the way the previously known nickel benzoates discolour the polymers. It is furthermore known to stabilise polyolefines by thiobisphenol-nickel-alkanolamine complexes. The new mixtures show a much better light-protection action than these compounds.

In accordance with the definition, $R^1$, $R^2$, $R^3$, $R^4$, $R^5$, $R^6$, $R^7$, $R^8$, $R^9$, $R^{10}$, $R^{11}$, $R^{12}$, $R^{14}$ and $R^{15}$ can be alkyl groups.

Within the limits indicated under the formula I, these groups can be methyl, ethyl, n-propyl, iso-propyl, n-butyl, sec.-butyl, tert.butyl, n-amyl, tert.amyl, n-hexyl, n-octyl, n-decyl, n-dodecyl, n-tetradecyl, n-hexadecyl or n-octadecyl.

$R^4$ and $R^5$ of the component (a) mentioned under (B) can, together with the nitrogen atom, represent the radical of a heterocyclic structure of the pyrrolidine series, such as, for example, pyrrolidine or 3-pyrrolidinol, of the piperidine series, such as, for example, piperidine, 2,6-dimethylpiperidine, 4-hydroxypiperidine and 4-methylpiperidine, of the piperazine series such as, for example, N-methylpiperazine, piperazine or N-2-hydroxyethylpiperazine, or of the morpholine series such as, for example, morpholine, 2,5- and 3,5-dimethylmorpholine.

As component B, the following alcohols, for example, can be used in the mixture according to the invention:

N(CH₂CH₂OH)₃

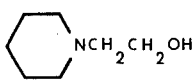

NH(CH₂CH₂OH)₂
NH₂CH₂CH₂OH
(CH₃)₂NCH₂CH₂CH₂OH
CH₃NHCH₂CH₂OH (CH₃)₂NCH₂CH₂OH
C₄H₉N(CH₂CH₂OH)₂
NH₂CH₂CH₂CH₂OH (CH₃)₂NCH₂CHOHCH₃

N(CH₂CHOHCH₃)₃

Ph-N(CH₂CH₂OH)₂
C₈H₁₇OCH₂CHOHCH₂OH
C₁₂H₂₅OCH₂CHOHCH₂OH

CH₃CH₂(OCH₂CH₂)₂OCH₂CHOHCH₂OH

HOCH₂—C(CH₂OH)(CH₂OH)—CH₂OH

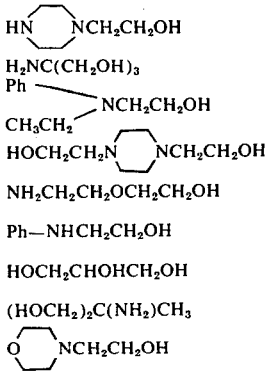

HN⟨⟩NCH₂CH₂OH
H₂NC(CH₂OH)₃
Ph
CH₃CH₂⟩NCH₂CH₂OH
HOCH₂CH₂N⟨⟩NCH₂CH₂OH
NH₂CH₂CH₂OCH₂CH₂OH
Ph—NHCH₂CH₂OH
HOCH₂CHOHCH₂OH
(HOCH₂)₂C(NH₂)CH₃
O⟨⟩NCH₂CH₂OH

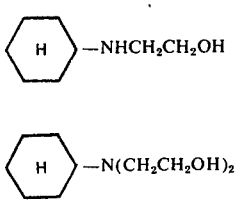

The new mixtures provide protection against degradation for synthetic polymers, preferably α-olefine polymers, such as polypropylene, optionally crosslinked polyethylene, polyisobutylene, polymethylbutene-1, polymethylpentene-1, polybutene-1, polyisoprene and polybutadiene; polystyrene and its copolymers such as, for example, polyacrylonitrile-styrene copolymers or polyacrylonitrile-butadiene-styrene copolymers; copolymers of the monomers on which the homopolymers mentioned are based, such as ethylene-propylene copolymers, propylene-butene-1 copolymers and terpolymers of ethylene and propylene with a diene such as, for example, hexadiene, dicyclopentadiene or ethylidenenorbornene; mixtures of the abovementioned homopolymers such as, for example, mixtures of polypropylene and polyethylene, polypropylene and polybutene-1, polypropylene and polyisobutylene. Polypropylene and its mixtures and the copolymers which contain polypropylene units are preferred.

In the new mixtures, the molar ratio of the components A to B is preferably 1:0.5 to 1:2, and according to the definition B either denotes a single compound or a mixture of such compounds. In the latter case, the molar ratio A to B is the ratio of the mols of the compound A to the sum of the mols of the compounds under B.

The new mixtures are incorporated into the substrates in a concentration of 0.01 to 5% by weight, calculated relative to the material to be stabilised. Preferably, 0.05 to 1.5, and particularly preferably 0.1 to 0.8, % by weight of the mixtures, calculated relative to the material to be stabilised, are incorporated into the latter.

The incorporation can be effected after the polymerisation, for example by mixing the mixtures, and optionally, further additives into the melt in accordance with the methods customary in the art, before or during shaping, or by application of the dissolved or dispersed mixtures to the polymer, optionally with subsequent evaporation of the solvent.

The mixtures of the components A and B can also be incorporated in the form of a masterbatch, which contains these mixtures, for example, in a concentration of 2.5 to 25% by weight, into the polymers to be stabilised. In the case of crosslinked polyethylene, the mixtures are added before crosslinking. As further additives together with which the stabilisers usable according to the invention can be employed, there may be mentioned:

1. Antioxidants of the aminoaryl and hydroxyaryl series. Amongst the latter, there should be mentioned the sterically hindered phenol compounds, for example: 2,2'-thiobis(4-methyl-6-tert.butylphenol), 4,4'-thiobis-(3-methyl-6-tert.butylphenol), 2,2'-methylene-bis-(4-methyl-6-tert.butylphenol), 2,2'-methylene-bis-(4-ethyl-6-tert.butylphenol), 4,4'-methylene-bis-(2-methyl-6-tert.butylphenol), 4,4'-butylidene-bis-(3-methyl-6-tert.butylphenol), 2,2'-methylene-bis-[4-methyl-6-(α-methylcyclohexyl)-phenol], 2,6-di(2-hydroxy-3-tert.butyl-5-methylbenzyl)-4-methyl-phenol, 2,6-di-tert.butyl-4-methylphenol, 1,1,3-tris-2-methyl-(4-hydroxy-5-tert-butyl-phenyl)-butane, 1,3,5-trimethyl-2,4,6-tri-(3,5-di-tert.butyl-4-hydroxybenzyl)-benzene, esters of β-4-hydroxy-3,5-di-tert-butylphenyl-propionic acid with monohydric or polyhydric alcohols, such as methanol, ethanol, octadecanol, hexanediol, nonanediol, thiodiethylene glycol, trimethylolethane or pentaerythritol, 2,4-bis-octylmercapto-6-(4-hydroxy-3,5-di-tert.butylanilino)-s-triazine, 2,4-bis-(4-hydroxy-3,5-di-tert.-butylphenoxy)-6-octylmercapto-s-triazine, 1,1-bis-(4-hydroxy-2-methyl)-5-tert.butylphenyl)-3-dodecylmercaptobutane, 4-hydroxy-3,5-di-tert.-butylbenzyl-phosphoric acid esters, such as the dimethyl, diethyl or dioctadecyl ester, (3-methyl-4-hydroxy-5-tert.-butylbenzyl)-malonic acid dioctadecyl ester, S-(3,5-dimethyl-4-hydroxyphenyl)-thioglycollic acid octadecyl ester, and esters of bis-(3,5-di-tert.butyl-4-hydroxybenzyl)-malonic acid, such as the didodecyl ester, the dioctadecyl ester and the 2-dodecylmercaptoethyl ester.

Amongst the aminoaryl derivatives there should be mentioned aniline and naphthylamine derivatives as well as their heterocyclic derivatives, for example phenyl-1-naphthylamine, phenyl-2-naphthylamine, N,N'-diphenyl-p-phenylenediamine, N,N'-di-2-naphthyl-p-phenylenediamine, N,N'-di-sec.butyl-p-phenylenediamine, 6-ethoxy-2,2,4-trimethyl-1,2-dihydroquinoline, 6-dodecyl-2,2,4-trimethyl-1,2-dihydroquinoline, monooctyliminodibenzyl and dioctyliminodibenzyl, and polymerised 2,2,4-trimethyl-1,2-dihydroquinoline, though in the case of the combined use of the mixtures with the abovementioned amine compounds the stabilised polymer no longer has such good colour properties, because of the tendency of the amine compounds to discolour.

2. UV-absorbers and light protection agents, such as:
   a. 2-(2'-hydroxyphenyl)-benztriazoles, for example the 5'-methyl-, 3',5'-di-tert.butyl-, 5'-tert.butyl-, 5-chloro-, 3',5'-di-tert.butyl-, 5-chloro-3'-tert.butyl-5'-methyl-, 3',5'-di-tert.amyl-, 3'-methyl-5'-β-carbomethoxyethyl- and 5-chloro-3',5'-di-tert.amyl derivative.
   b. 2,4-Bis-(2'-hydroxyphenyl)-6-alkyl-s-triazines, for example the 6-ethyl- or 6-undecyl-derivative.

c. 2-Hydroxy-benzophenones, for example the 4-hydroxy-, 4-methoxy-, 4-octoxy-, 4-decyloxy-, 4-dodecyloxy-, 4,2', 4-tri-hydroxy or 2'-hydroxy-4,4'-dimethoxy derivative.

d. 1,3-Bis-(2'-hydroxy-benzoyl)-benzenes, for example 1,3-bis-(2'-hydroxy-4'-hexyloxy-benzoyl)-benzene, 1,3-bis-(2'-hydroxy-4'-octoxy-benzoyl)-benzene and 1,3-bis-(2'-hydroxy-4'-dodecyloxy-benzoyl)-benzene.

e. Aryl esters of optionally substituted benzoic acids, such as, for example, phenyl salicylate, octylphenyl salicylate, benzoylresorcinol, dibenzoyl-resorcinol, and 3,5-di-tert.butyl-4-hydroxybenzoic acid 2,4-di-tert.butylphenyl ester or octadecyl ester.

f. Acrylates, for example α-cyano-β, β-diphenylacrylic acid ethyl ester or isooctyl ester, α-carbomethoxycinnamic acid methyl ester, α-cyano-β-methyl-p-methoxycinnamic acid methyl ester or butyl ester and N-(-β-carbomethoxy-vinyl)-2-methyl-indoline.

g. Oxalic acid diamides, for example 4,4'-dioctyloxyoxanilide, 2,2'-di-octyloxy-5,5'-di-tert.butyl-oxanilide and 2,2'-di-dodecyloxy-5,5'-di-tert.butyl-oxanilide.

3. Nucleating agents, such as 4-tert.butylbenzoic acid, adipic acid and diphenylacetic acid.

4. Compounds which destroy peroxide, such as esters of β-thiodipropionic acid, for example the lauryl, stearyl, myristyl or tridecyl ester. Salts of 2-mercaptobenzimidazole, for example the zinc salt, and diphenylthiourea.

5. Other additives such as plasticisers, antistatic agents, dyeing auxiliaries, flameproofing agents, pigments, carbon black, asbestos, glass fibres, kaolin, talc and blowing agents.

6. Co-stabilisers, such as salts of alkaline earth metals, preferably salts of alkaline earth metals and carboxylic acids, such as, for example, calcium stearate, calcium palmitate, calcium oleate and calcium laurate.

The manufacture of the compound of the formula I is described in U.S. Pat. No. 3,189,630.

The invention is described in more detail in the examples which follow. Therein, parts denote parts by weight and percentages (%) denote percentages by weight.

EXAMPLE I 1,000 parts of polypropylene powder [melt index 1.5 g/10 minutes (230°C, 2,160 g)] are mixed in a drum mixer with 0.5 part of tetrakis-β (3,5-di-tert.-butyl-4-hydroxyphenyl)-propionic acid pentaerythritol ester, 3 parts of dilauryl thiodipropionate (DLTDP), 5 parts of Ni 3,5-di-tert.butyl-4-hydroxy-benzoate which contains 2.36% of water bound as a complex, and an additive of the table which follows, and the whole is subsequently homogenised for 10 minutes at 200°C in a Brabender plastograph. The polymer mass is then pressed in a heated press for 6 minutes at 240°C to give 1 mm thick sheets. A visual assessment of the test specimens for their discolouration gives the following results:

| No. | Parts | Additive | Appearance of the Sheet after 6 minutes at 240°C |
|---|---|---|---|
|  |  | none | grey discolouration |
| 1 | 2 parts | N(CH$_2$CH$_2$OH)$_3$ | no discolouration |
| 2 | 1.5 parts | NH(CH$_2$CH$_2$OH)$_2$ | no discolouration |
| 3 | 1 part | NH$_2$(CH$_2$CH$_2$OH) | slight grey tinge |
| 4 | 1.5 parts | (CH$_3$)$_2$NCH$_2$CH$_2$CH$_2$OH | no discolouration |
| 5 | 2 parts | C$_4$H$_9$N(CH$_2$CH$_2$OH)$_2$ | no discolouration |
| 6 | 2 parts | N(CH$_2$CHOHCH$_3$)$_3$ | slight grey tinge |
| 7 | 2 parts | Ph-N(CH$_2$CH$_2$OH)$_2$ | no discolouration |
| 8 | 1 part | HOCH$_2$CHOHCH$_2$OR | no discolouration |
| 9 | 1.5 parts |  | no discolouration |
| 10 | 2.5 parts | C$_{12}$H$_{25}$OCH$_2$CHOHCH$_2$OH | no discolouration |
| 11 | 1.5 parts | HN⌒NCH$_2$CH$_2$OH | no discolouration |
| 12 | 2.5 parts | CH$_3$CH$_2$(OCH$_2$CH$_2$)$_2$OCH$_2$CHOHCH$_2$OH | no discolouration |

EXAMPLE 2

1,000 parts of polypropylene powder (melt index 1.5 g/10 minutes (230°C, 2,160 g)) are mixed in a drum mixer with 1 part of β-(3,5-di-tert.-butyl-4-hydroxyphenyl)propionic acid octadecyl ester and 5 parts of nickel 3,5-di-tert.-butyl-4-hydroxy-benzoate which contains 2.36% of water bound as a complex, and an additive of the table which follows, and the mixture is subsequently granulated in a Buss Co-kneader at a temperature of 200°C.

The resulting granules are converted in the usual manner, on an extruder with a slit die, to give a sheet which is cut into tapes which are subsequently stretched at an elevated temperature using a stretch ratio of 1:6 and are wound up (gauge of the tapes: 700–900 den; tensile strength: 5.5–6.5 g/den).

The polypropylene tapes thus produced are mounted, free of tension, on sample carriers and are exposed in the Xenotest 150 apparatus. After various times 5 test specimens at a time are removed and their tensile strength is determined. The exposure time after which the tensile strength of the tapes has declined to 50% of the initial value is taken as a measure of the protective action of the individual light protection agents. The values obtained are listed in the table which follows:

| No. | Parts | Additive | Hours of Exposure until 50% tensile strength is reached |
|---|---|---|---|
|  |  | none | 3,850 |
| 1 | 2 parts | $N(CH_2CH_2OH)_3$ | 3,750 |
| 2 | 1.5 parts | $NH(CH_2CH_2OH)_2$ | 3,700 |
| 3 | 1 part | $NH_2(CH_2CH_2OH)$ | 3,800 |
| 4 | 1.5 parts | $(CH_3)_2NCH_2CH_2OH$ | 3,600 |
| 5 | 2 parts | $C_4H_9N(CH_2CH_2OH)_2$ | 3,650 |
| 6 | 2 parts | $N(CH_2CHOHCH_3)_3$ | 3,700 |
| 7 | 2 parts | $Ph-N(CH_2CH_2OH)_2$ | 3,600 |
| 8 | 1 part | $HOCH_2CHOHCH_2OH$ | 3,650 |
| 9 | 1.5 parts | 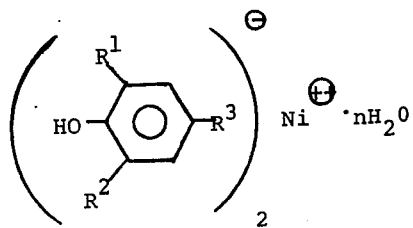 | 3,800 |
| 10 | 2.5 parts | $C_{12}H_{25}OCH_2CHOHCH_2OH$ | 3,950 |
| 11 | 1.5 parts | HN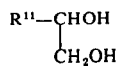$NCH_2CH_2OH$ | 3,550 |
| 12 | 2.5 parts | $CH_3CH_2(OCH_2CH_2)_2OCH_2CHOHCH_2OH$ | 3,850 |
| 13 | 1 part | $(CH_3)_2NCH_2CHOHCH_3$ | 3,750 |
| 14 | 2 parts | $C_8H_{17}OCH_2CHOHCH_2OH$ | 3,900 |

What we claim is:

1. A composition of matter stabilised against thermal and light degradation and discoloration which comprises a polymonoolefin and a mixture of A. A nickel benzoate of the formula

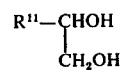

wherein $R^1$ denotes hydrogen or alkyl with 1 to 5 carbon atoms, of the substituents $R^2$ and $R^3$, one denotes an alkyl with 3 to 8 carbon atoms and the other denotes —COO⁻ and $n$ denotes a value of 0 to 2, B. a polyol of the formula

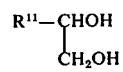

wherein $R^{11}$ denotes —$CH_2OR^{12}$ and $R^{12}$ denotes alkyl with 1 to 18 carbon atoms or phenyl, such that the amount of components (A) and (B) is in the concentration of 0.01 to 5% by weight of the total composition and the molar ratio of A:B is in the range of 1:0.5 to 1:2, C. from 0.05 to 0.1% by weight of the total composition of a hindered phenol antioxidant selected from the group consisting of tetrakis β-(3,5-di-tert-butyl-4-hydroxyphenyl)propionic acid pentaerythritol ester and β-(3,5-di-tert-butyl-4-hydroxyphenyl)propionic acid n-octadecyl ester, and D. from 0 to 0.3% by weight of the total composition of an ester of β-thiodipropionic acid selected from the group consisting of dilauryl β-thiodipropionate and distearyl β-thiodipropionate.

2. A composition according to claim 1 wherein the polyol (B) is of the formula

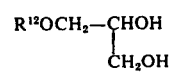

where $R^{11}$ denotes —$CH_2OR^{12}$ and $R^{12}$ denotes alkyl with 1 to 12 carbon atoms or phenyl.

3. A composition according to claim 1 where the nickel benzoate (A) is

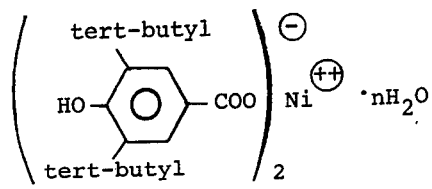

where $n$ denotes a value from 0 to 2, and where the polyol (B) is of the formula $$R^{11}-\underset{CH_2OH}{CHOH}$$

where $R^{11}$ denotes —$CH_2OR^{12}$ where $R^{12}$ denotes alkyl with 1 to 12 carbon atoms or phenyl.

4. A composition according to claim 3 wherein the polyol (B) is of the formula $$R^{12}OCH_2-\underset{CH_2OH}{CHOH}$$

where $R^{12}$ denotes alkyl with 8 to 12 carbon atoms.

5. A composition according to claim 1 where the amount of components (A) and (B) is in the concentration of 0.05 to 1.5% by weight of the total composition.

6. A composition according to claim 1 where the amount of components (A) and (B) is in the concentration of 0.1 to 0.8% by weight of the total composition.

7. A composition according to claim 1 where the polymonoolefin is polypropylene.

8. A composition according to claim 1 where *n* denotes a value of 0.75.

9. A composition according to claim 3 where the glycol (B) is

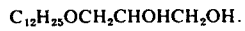

10. A composition according to claim 3 where the glycol (B) is

11. A composition of matter stabilised against thermal and light degradation and discoloration which comprises a polymonoolefin and a mixture of A. a nickel benzoate of the formula

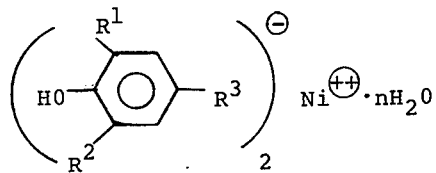

wherein $R^1$ denotes hydrogen or alkyl with 1 to 5 carbon atoms, of the substituents $R^2$ and $R^3$ one denotes an alkyl with 3 to 8 carbon atoms and the other denotes —COO⁻ and n denotes a value of 0 to 2, B. a glycol of the formula

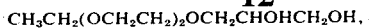

such that the amount of components (A) and (B) is in the concentration of 0.01 to 5% by weight of the total composition and the molar ratio of A:B is in the range of 1:05.5 to 1:2

C. from 0.05 to 0.1% by weight of the total composition of a hindered phenol antioxidant selected from the group consisting of tetrakis β-(3,5-di-tert-butyl-4-hydroxyphenyl)propionic acid pentaerythritol ester and β-(3,5-di-tert-butyl-4-hydroxyphenyl)propionic acid n-octadecyl ester, and D. from 0 to 0.3% by weight of the total composition of an ester of β-thiodipropionic acid selected from the group consisting of dilauryl β-thiodipropionate and distearyl β-thiodipropionate.

12. A composition according to claim 11 wherein the nickel benzoate (A) is

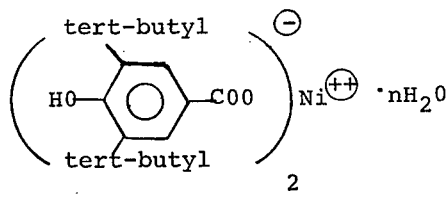

where *n* denotes a value from 0 to 2.

* * * * *